(12) United States Patent
Kunori

(10) Patent No.: US 10,283,090 B2
(45) Date of Patent: May 7, 2019

(54) INFORMATION PROCESSING APPARATUS, METHOD OF CONTROLLING THE SAME AND NON-TRANSITORY COMPUTER-READABLE STORAGE MEDIUM

(71) Applicant: CANON KABUSHIKI KAISHA, Tokyo (JP)

(72) Inventor: Shiro Kunori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 15/419,140

(22) Filed: Jan. 30, 2017

(65) Prior Publication Data
US 2017/0243565 A1 Aug. 24, 2017

(30) Foreign Application Priority Data
Feb. 22, 2016 (JP) .................. 2016-031461

(51) Int. Cl.
| | |
|---|---|
| *G09G 5/36* | (2006.01) |
| *G09G 5/00* | (2006.01) |
| *G09G 5/391* | (2006.01) |
| *G06F 3/041* | (2006.01) |
| *G06F 3/147* | (2006.01) |
| *H04N 1/00* | (2006.01) |
| *G06F 9/451* | (2018.01) |

(52) U.S. Cl.
CPC ............ *G09G 5/363* (2013.01); *G06F 3/0416* (2013.01); *G06F 3/147* (2013.01); *G09G 5/005* (2013.01); *G09G 5/391* (2013.01); *G06F 9/451* (2018.02); *G09G 2340/0407* (2013.01); *G09G 2354/00* (2013.01); *H04N 1/00392* (2013.01); *H04N 1/00503* (2013.01)

(58) Field of Classification Search
CPC ........ G09G 5/363; G09G 5/391; G09G 5/005; G06F 3/0416; G06F 3/147
See application file for complete search history.

(56) References Cited

U.S. PATENT DOCUMENTS

| | | | |
|---|---|---|---|
| 9,336,322 B2 | 5/2016 | Kunori | |
| 9,830,889 B2* | 11/2017 | Diard | ............. G09G 5/393 |
| 2008/0204460 A1* | 8/2008 | Marinkovic | ......... G06F 1/3203 345/502 |

(Continued)

FOREIGN PATENT DOCUMENTS

| | | |
|---|---|---|
| JP | 5-713180 B2 | 5/2015 |
| WO | 2010/047339 A1 | 4/2010 |

*Primary Examiner* — Sardis F Azongha
(74) *Attorney, Agent, or Firm* — Venable LLP

(57) ABSTRACT

An information processing apparatus that has a display unit and a plurality of graphic controllers, the apparatus comprises: a detection unit that detects an event that is generated by a user operation on the display unit; a determination unit that determines, when the event is detected by the detection unit, which of the plurality of graphic controllers an application displaying a screen on the display unit uses; and a transmission unit that, based on a resolution of the display unit and information of the application for which the determination is made by the determination unit, converts coordinate information of the user operation that the event indicates to a value of a coordinate system corresponding to the graphic controller that the application uses, and transmits a result of the conversion to the application.

7 Claims, 9 Drawing Sheets

(56) References Cited

U.S. PATENT DOCUMENTS

| | | | |
|---|---|---|---|
| 2009/0135199 A1* | 5/2009 | Okamoto | B60K 35/00 345/619 |
| 2010/0122187 A1* | 5/2010 | Kunori | G06F 3/04845 715/762 |
| 2011/0119326 A1 | 8/2011 | Takano | |
| 2012/0023451 A1* | 1/2012 | Kuroyanagi | G06F 8/38 715/835 |
| 2013/0207984 A1* | 8/2013 | Walrath | G06T 1/20 345/505 |
| 2015/0199100 A1 | 7/2015 | Kunori | |
| 2015/0205616 A1* | 7/2015 | Thai | G06F 9/463 345/542 |
| 2015/0254041 A1* | 9/2015 | Hoshihara | B60K 35/00 345/173 |
| 2016/0019861 A1* | 1/2016 | Li | G06K 9/00986 345/694 |
| 2017/0024065 A1 | 1/2017 | Kunori | |

* cited by examiner

FIG. 5A

| CONTROLLER TYPE | ID | REGION | PARENT ID | CORRESPONDING OPERATION |
|---|---|---|---|---|
| WINDOW | 1 | (0,0)~(800,600) | | |
| WINDOW | 1000 | (0,0)~(800,600) | 1 | |
| BUTTON | 1001 | (220,470)~(370,550) | 1 | DISPLAY WINDOW WITH ID "2000" |
| BUTTON | 1002 | (450,470)~(600,560) | 1 | DISPLAY WINDOW WITH ID "3000" |
| WINDOW | 2000 | (0,0)~(800,600) | 1 | |
| ..... | ..... | ..... | ..... | ..... |

FIG. 5B

| CONTROLLER TYPE | ID | REGION | PARENT ID | CORRESPONDING OPERATION |
|---|---|---|---|---|
| WINDOW | 1 | (0,0)~(800,600) | | |
| WINDOW | 5000 | (0,0)~(800,600) | 1 | |
| WINDOW | 5100 | (220,470)~(370,550) | 5000 | |
| BUTTON | 5101 | (220,470)~(370,550) | 5100 | DISPLAY WINDOW WITH ID "6000" |
| WINDOW | 5200 | (450,470)~(600,550) | 5000 | |
| BUTTON | 5201 | (450,470)~(600,550) | 5200 | DISPLAY WINDOW WITH ID "7000" |
| WINDOW | 6000 | (0,0)~(800,600) | 1 | |
| ..... | ..... | ..... | ..... | ..... |

INFORMATION PROCESSING APPARATUS, METHOD OF CONTROLLING THE SAME AND NON-TRANSITORY COMPUTER-READABLE STORAGE MEDIUM

BACKGROUND OF THE INVENTION

Field of the Invention

The present invention relates to an information processing apparatus, a method of controlling the same, and a non-transitory computer-readable storage medium.

Description of the Related Art

Touch panels by which it is possible to select a target object that is displayed on an operation unit of an information processing apparatus by touching the target object with a finger are spreading. Each such touch panel has a respective determined resolution, and it is possible to connect and use touch panels of different resolutions to a single device in accordance with the situation.

Depending on the resolution of the touch panel, the appearance differs even when the same target object is displayed. For example, a target object that was displayed on the full area of the touch panel in a touch panel whose resolution is low is displayed in only a partial region of the touch panel in a touch panel whose resolution is high. For this reason, there is a problem in that regions in which nothing is displayed are created when a touch panel whose resolution is high is connected. To solve this problem, a method of uniformly magnifying/reducing coordinates in which to display or detect in accordance with a detection region or a resolution of a touch panel (for example, Japanese Patent No. 5713180) is known. As another method, there is a method in which a target object that is displayed on a low resolution touch panel is displayed as is on a high resolution touch panel, and another target object is displayed in a free region.

When a user touches a target object on a touch panel, as internal processing of an information processing apparatus, the target object is selected by generating event information that represents the fact that it was touched, and a graphic controller performing processing based on this event information. There are various types of graphic controllers, and the necessary event information for selecting the target object differs depending on the type.

In an information processing apparatus that has a touch panel, a plurality of applications (hereinafter referred to as apps) operate, and different graphic controllers exist for each app implementation language. Here, there are cases in which a difference arises in the contents of the event information that is necessary depending on the graphic controller. For example, position information for operation by a user on the touch panel is an example of event information. There are graphic controllers that can use, as is, position information of a user operation that the touch panel detected, but there are others for which it is necessary to convert to position information (a coordinate system) that differs depending on a relation with other objects that are being displayed. There is a problem in that if the event information that a graphic controller requires is not passed appropriately, the app will cease to operate normally.

SUMMARY OF THE INVENTION

According to one aspect of the present invention, there is provided an information processing apparatus that has a display unit and a plurality of graphic controllers, the apparatus comprising: a detection unit configured to detect an event that is generated by a user operation on the display unit; a determination unit configured to determine, when the event is detected by the detection unit, which of the plurality of graphic controllers an application displaying a screen on the display unit uses; and a transmission unit configured to, based on a resolution of the display unit and information of the application for which the determination is made by the determination unit, convert coordinate information of the user operation that the event indicates to a value of a coordinate system corresponding to the graphic controller that the application uses, and transmit a result of the conversion to the application.

According to another aspect of the present invention, there is provided a method of controlling an information processing apparatus that has a display unit and a plurality of graphic controllers, the method comprising: detecting an event that is generated by a user operation on the display unit; determining, when the event is detected, which of the plurality of graphic controllers an application displaying a screen on the display unit uses; and based on a resolution of the display unit and information of the application for which the determination is made, converting coordinate information of the user operation that the event indicates to a value of a coordinate system corresponding to the graphic controller that the application uses, and transmitting a result of the conversion to the application.

According to another aspect of the present invention, there is provided a non-transitory computer-readable storage medium storing a program for causing a computer that has a display unit and a plurality of graphic controllers to function as: a detection unit configured to detect an event that is generated by a user operation on the display unit; a determination unit configured to determine, when the event is detected by the detection unit, which of the plurality of graphic controllers an application displaying a screen on the display unit uses; and a transmission unit configured to, based on a resolution of the display unit and information of the application for which the determination is made by the determination unit, convert coordinate information of the user operation that the event indicates to a value of a coordinate system corresponding to the graphic controller that the application uses, and to transmit a result of the conversion to the application.

By the present invention, in a case where a plurality of graphic controllers that operate using different event information are operating, it is possible to cause an app to operate correctly whatever the graphic controller that the app uses.

Further features of the present invention will become apparent from the following description of exemplary embodiments (with reference to the attached drawings).

BRIEF DESCRIPTION OF THE DRAWINGS

FIGS. 5A and 5B are views illustrating configuration examples of a rendering controller management table.

DESCRIPTION OF THE EMBODIMENTS

Hereinafter, a description of embodiments for implementing the present invention is given using drawings.

First Embodiment

A description of the present embodiment is given using an image forming apparatus which is one embodiment of an information processing apparatus.

[Hardware Configuration]

(Controller Unit of Image Forming Apparatus)

Figure 1:
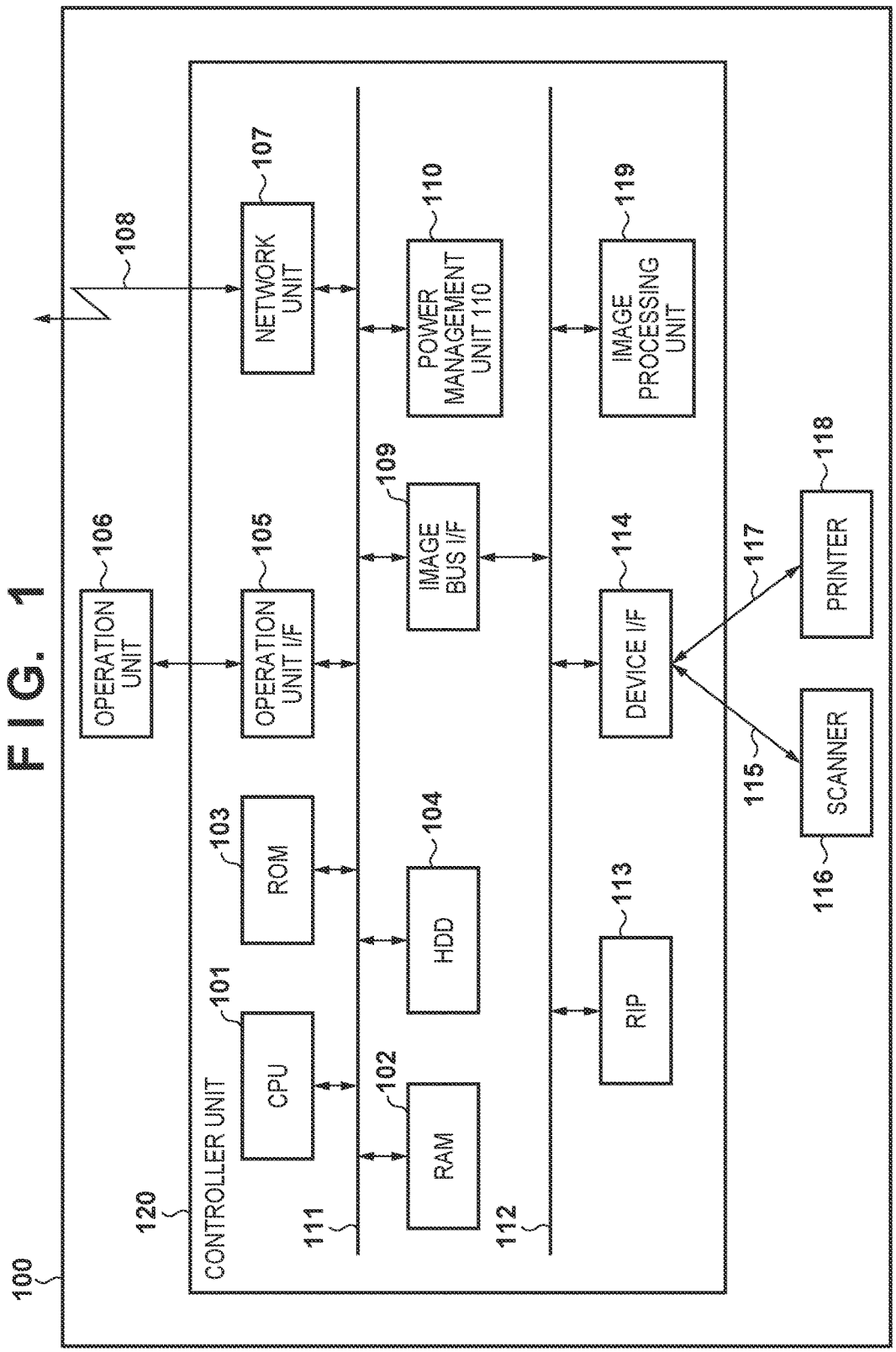
FIG. 1 is a view representing a controller unit of an image forming apparatus according to the present application invention.

FIG. 1 illustrates an example of an internal structure of a controller unit of an image forming apparatus 100 according to the embodiment. A controller unit 120 has a CPU 101 for executing various control programs. The CPU 101 causes a system to boot based on a boot program stored in a ROM 103. Then, the CPU 101 reads out a control program stored in an HDD (hard disk apparatus) 104 and executes predetermined processing using a RAM 102 as a work area. By this control program, the CPU 101 is able to execute a predetermined control of a Java program, or the like. The HDD 104 is a non-volatile storage region, stores various control programs, and stores image data and information relating to all communication means that a network unit 107 has.

The RAM 102, the ROM 103, and the HDD 104 are connected to the CPU 101 via a system bus 111. Furthermore, an operation unit I/F 105, the network unit 107, an image bus I/F 109, and a power management unit 110 are connected to the CPU 101 through the system bus 111.

The operation unit I/F 105 is an interface unit for an operation unit (display) 106 and performs processing for obtaining and transferring image data to be displayed on the operation unit 106 from the RAM 102 and processing for transferring a signal generated by the operation unit 106 to the CPU 101.

The operation unit 106 performs display processing for displaying a target object such as a button that a user can operate, and input processing for detecting a signal (input signal) of a user operation with respect to information displayed by the display processing. That is, the operation unit 106 functions as a user interface and includes a display unit which has an output function.

The power management unit 110 performs management of power OFF/ON of the image forming apparatus 100. Note, if power ON is detected, the CPU 101 causes the system to boot based on the boot program of the ROM 103, and executes a control program stored in the HDD 104.

The network unit 107 is connected to a LAN 108 and performs input and output of information via the LAN 108. If a Web server (not shown) or an external apparatus 400 is connected to the LAN 108, the image forming apparatus 100 can obtain information via the LAN 108 from the external apparatus. Also, the image forming apparatus 100 is capable of connecting to the Internet (not shown) via a proxy server (not shown) in the LAN 108 and obtaining Web content from a Web server on the Internet.

The image bus I/F 109 is a bus bridge connected between the system bus 111 and an image bus 112, and converts data structures. The image bus 112 is configured by a bus in compliance with an IEEE 1394 specification or a PCI bus capable of transferring image data at a high rate. An RIP (Raster Image Processor) 113, a device I/F 114, and an image processing unit 119 are connected to the image bus 112.

The RIP 113 expands a PDL code into a bitmap image. The device I/F 114 connects a scanner 116 and a printer 118, which are image input and output devices, with the controller unit 120, and performs a conversion between synchronous/asynchronous systems of image data. Here, the device I/F 114 and the scanner 116 are connected through a cable 115, and the device I/F 114 and the printer 118 are connected through a cable 117.

The image processing unit 119 performs compression/decompression processing (JPEG for multi-value image data, and JBIG, MMR, and MH for binary image data). Also, it performs correction, modification, and editing, such as a printer correction or a resolution conversion, on input image data or output screens.

In this way, the CPU 101 of the controller unit 120, based on each control program, comprehensively controls access to and from various devices connected to the system bus 111 and reads image information from the scanner 116 via the device I/F 114. After the CPU 101 performs predetermined processing on read-in image information, control in which image information is outputted to the printer 118 via the device I/F 114 is performed. Furthermore, the CPU 101 performs analysis/conversion processing of character data and image data obtained via the network unit 107, and saves to the HDD 104 or performs a display control in the operation unit 106.

(Control of Operation Unit by CPU)

Figure 2:
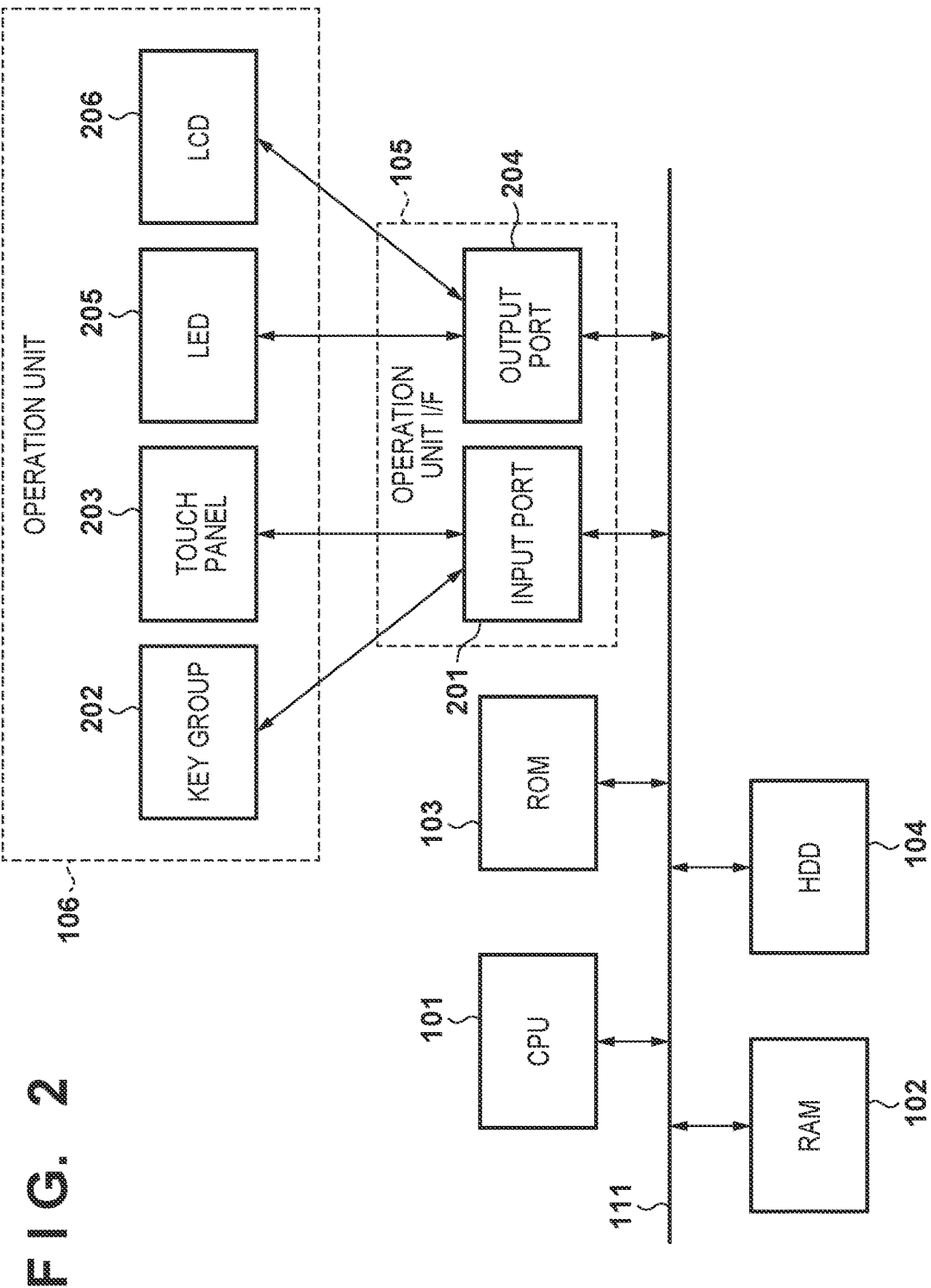
FIG. 2 is a view illustrating a configuration example of an operation unit and a periphery of the image forming apparatus according to the present application invention.

FIG. 2 illustrates a configuration example of the operation unit 106 and its periphery in FIG. 1. A touch panel 203 of the operation unit 106 and a key group 202 of various hard keys are connected to the CPU 101 through an input port 201 of the operation unit I/F 105. Also, position information indicating a press position on the touch panel 203 and key information corresponding to a press of the key group 202 are inputted to the CPU 101 through the input port 201.

An LED 205 and an LCD 206 of the operation unit 106 are connected to the CPU 101 through an output port 204 of the operation unit I/F 105. Lighting of the LED 205 and display of the LCD 206 are controlled by the CPU 101. The touch panel 203, on which a very small amount of electric current flows, is an electrostatic type apparatus that detects a touch position based on a change of electric charge that occurs upon a touch by a user, and the touch panel 203 is laid out to overlap with the LCD 206. By a user directly touching an operation target object such as a virtual button (hereinafter referred to as a button) displayed on the LCD 206, the touch panel 203 detects the position information (coordinates).

When the CPU 101 detects the position information, the operation target selected by the user is specified based on a target object currently displayed on the LCD 206 and position information thereof. Then, the CPU 101 detects a command to be executed in a case of selection of the specified operation target object from out of commands stored in the ROM 103 or the HDD 104 in advance, and executes the command. With this, screen data to be displayed on the LCD 206 is created. By the CPU 101 sending the created screen data to the LCD 206 via the output port 204, the display on the operation unit 106 can be changed. Note that the above described internal processing of the LCD 206 upon the user operation is common throughout all of the following description, and so description thereof is omitted hereinafter.

Also, the operation unit 106 (touch panel 203) has various resolutions, for example SVGA or WSVGA are examples of useable resolutions. Also, as necessary the user can change the resolution of the operation unit 106 that is used by physically replacing the device configuration of the image forming apparatus 100.

[Software Configuration]

Figure 3:
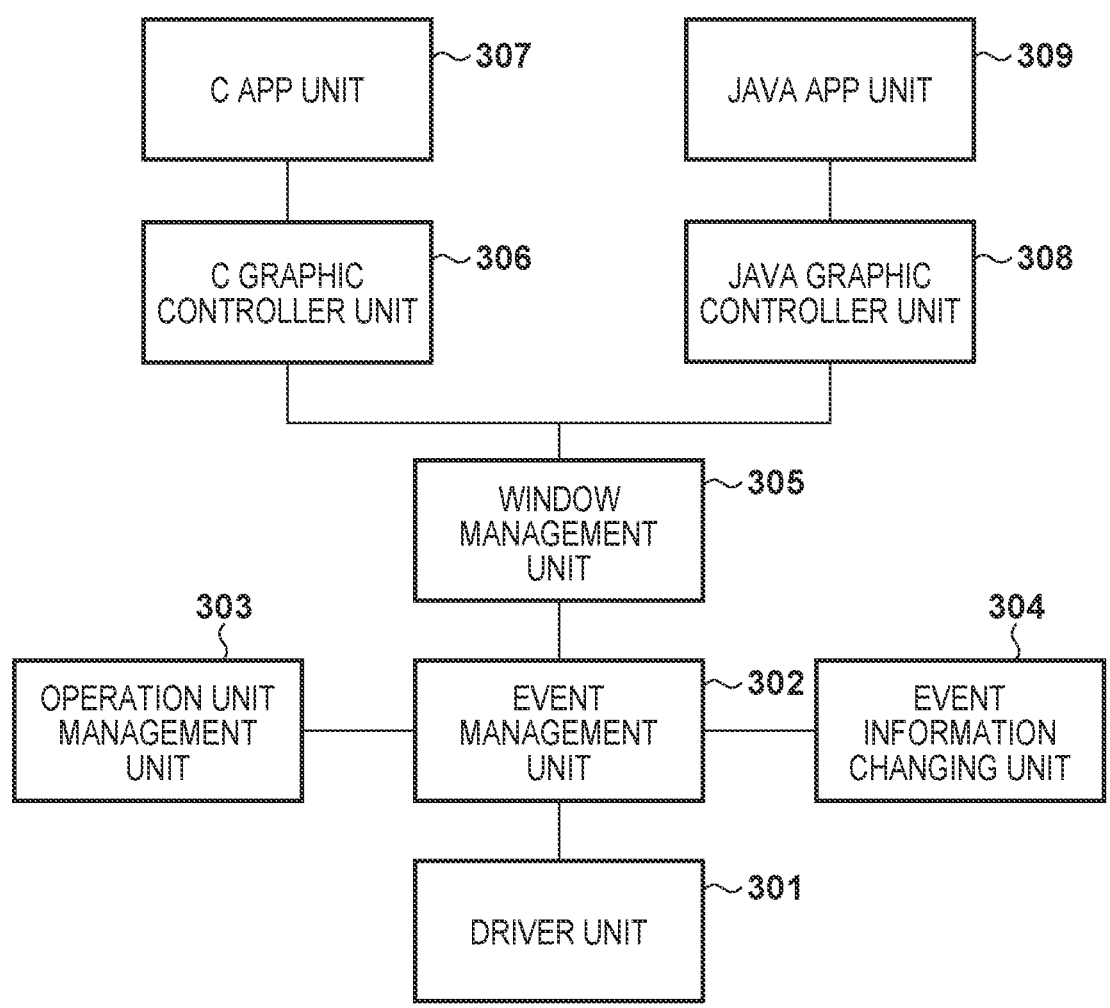
FIG. 3 is a view illustrating a software module configuration example according to the present application invention.

Next, a configuration of software modules operating on each piece of hardware such as the CPU 101 or the HDD 104 of the image forming apparatus 100 is described using FIG. 3. Note, processing of each module is realized by reading a program stored in the ROM 103 or the HDD 104 and executing predetermined processing thereof by commands of the CPU 101 using the RAM 102 as a work area. Also, various information generated by executing predetermined processing is stored in the RAM 102 or the HDD 104. This kind of processing for each module is similar unless a clear recitation is particularly made, so this kind of hardware description is omitted hereinafter. Also, the detailed processing of each module illustrated in FIG. 3 is described later using FIG. 7. Also, the image forming apparatus 100 includes both a C graphic controller and a Java graphic controller, and the detailed processing of these controllers is described later.

A driver unit 301 is a touch panel driver and is a module for detecting event information such as coordinates or a touch event that is generated when the user performs an operation such as a touch on the operation unit 106 (strictly speaking the LCD 206 of the operation unit 106). This event information includes a type of the event (an operation type such as a press or a release) and the coordinates of the event. The driver unit 301 transmits the detected event information to an event management unit 302.

The event management unit 302 is a module for receiving event information transmitted from the driver unit 301, performing predetermined processing using each module for the event information, and then transmitting the event information to a window management unit 305. Specifically, the event management unit 302 uses the window management unit 305 in a case of performing a determination of the app being displayed, and uses an event information changing unit 304 in a case of performing a change of the event information. An operation unit management unit 303 is a module for obtaining information to be displayed on the operation unit 106 of the image forming apparatus 100. The operation unit management unit 303 is capable of obtaining information of the resolution of the operation unit 106. The event information changing unit 304 is a module for receiving an event information change request from the event management unit 302, performing a change of the event information, and transmitting the changed event information to the event management unit 302.

The window management unit 305 is a module for receiving event information transmitted from the event management unit 302, and performing a transmission of the event information to the graphics controller unit corresponding to an app being displayed on the operation unit 106. In the present embodiment, it is assumed that a C graphics controller unit 306 and a Java graphics controller unit 308 are included as graphics controller units. Also, the window management unit 305 is capable of performing management of a window displayed on the operation unit 106, determining which window of which app is displayed on the operation unit 106, and displaying any window on the operation unit 106.

The C graphics controller unit 306 is a module comprised of rendering controllers such as a button, a list, or a window, used by C applications of a C app unit 307 (hereinafter called C apps) implemented in the C language. Note, these rendering controllers of the C graphics controller unit 306 are all laid out on windows, and it is possible to lay out a plurality of rendering controllers on one window. Therefore, the screen of the operation unit 106 is switched by switching the window. Note, it is assumed that information such as lay out coordinates of a rendering controller or execution processing corresponding to the rendering controller is included in the app program. Also, the C graphics controller unit 306 transmits an execution processing request to an app of a window being displayed on the operation unit 106 when event information is received from the window management unit 305.

The C app unit 307 is a group of C apps. The C apps of the C app unit 307 execute processing corresponding to the execution processing request when the execution processing request is received from the C graphics controller unit 306. For example, if a process A of a C app is desired to be executed, a button A for executing the process A is laid out on a specific window, and this window is displayed to the operation unit 106. Then, when the user presses the button A, the C graphics controller unit 306 detects a selection of the button A and transmits an event to request the execution of the process A which is associated with the button A to the C app.

The Java graphics controller unit 308 is a module comprised of rendering controllers such as a button or a list, used by Java applications of a Java app unit 309 (hereinafter called Java apps) implemented in the Java language. Also, the Java graphics controller unit 308 transmits an execution processing request to an app in a window being displayed on the operation unit 106 when the event information is received from the window management unit 305, similarly to the C graphics controller unit 306.

The Java app unit 309 is a group of Java apps. The Java apps of the Java app unit 309 execute processing corresponding to the event when an event is received from the Java graphics controller unit 308.

[Resolution of Operation Unit and App Display]

Here, a process in a case where the resolution of the operation unit 106 differs is described.

It is assumed that in the image forming apparatus 100, an operation unit 106 with SVGA (800*600) resolution and an operation unit 106 with WSVGA (1024*600) resolution can be used. It is possible to determine which operation unit 106 is connected to the image forming apparatus 100 by the CPU 101 performing a query to the operation unit 106 upon an activation of the image forming apparatus 100. Also, at this time, the information obtained from the operation unit 106 is stored on the RAM 102 or the HDD 104. Note, this kind of processing is the same as device detection processing of a general information processing apparatus and so details are omitted.

Firstly, it is described how the same app is displayed in cases when two types of operation units with different resolutions are used. Note, a region where the app (the C app or the Java app) displays a target object on the operation unit 106 is called an "app display region".

Figure 4A:
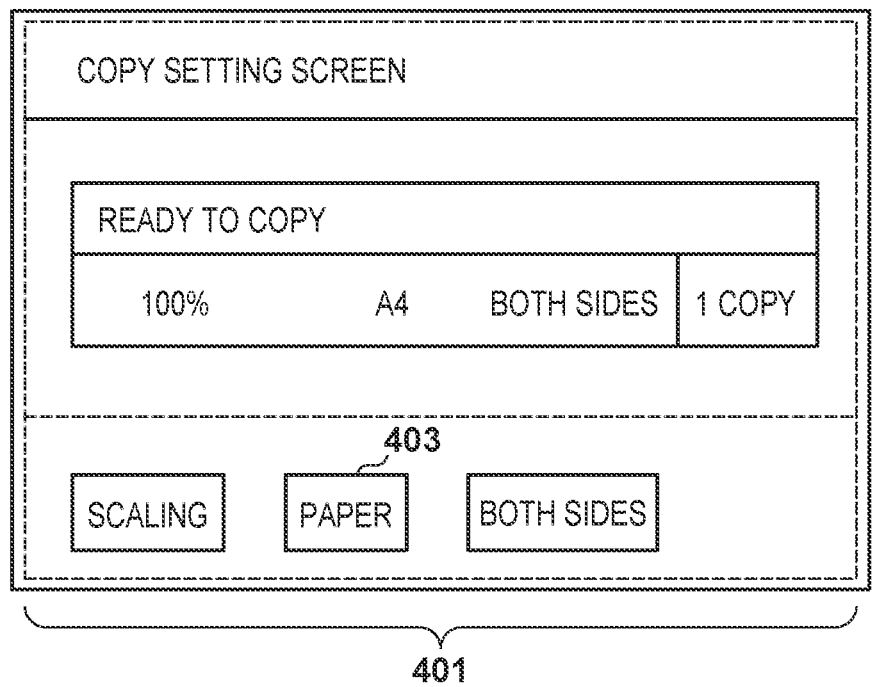
FIGS. 4A and 4B are views illustrating examples of screens displayed on the operation unit of the image forming apparatus.

FIG. 4A is a screen displayed if the operation unit 106 with the SVGA resolution is used, and is an example of a display of a copy app which is one of the Java apps. The entire region surrounded by a dashed line in FIG. 4A is an app display region 401 and only this app is displayed on the operation unit 106. That is, only the screen of the copy app is displayed on the entirety of the operation unit 106.

Figure 4B:
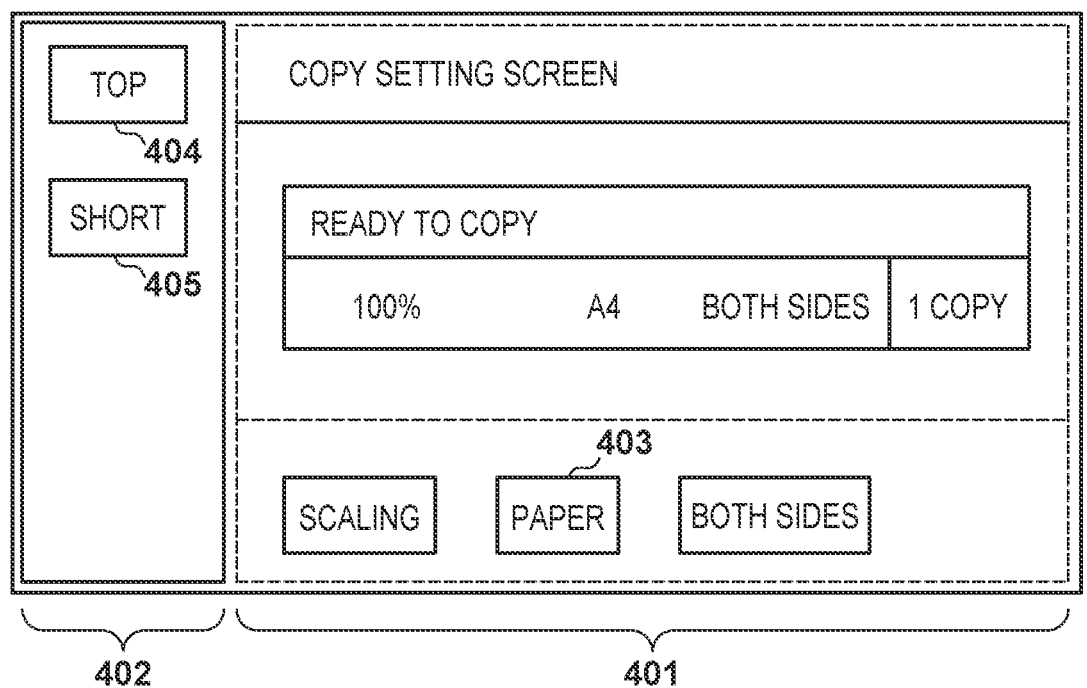

On the other hand, if the operation unit 106 with the WSVGA resolution is used, this copy app is displayed as shown in FIG. 4B. The app display region 401 in FIG. 4B is the same as the operation unit 106 with the SVGA resolution but a left menu region 402 is displayed on the left side of the app display region 401 in the case of the WSVGA operation unit 106. That is, in addition to the display region where an app screen is displayed, another display region (a region where other display content is displayed) is included in the case of the WSVGA operation unit 106. A change of the display content of the app (a screen switch) is executed only on the app display region 401, and a change of the display content of the app is not executed on the left menu region 402.

Also, the same thing is always displayed on the left menu region 402, regardless of the display content of the app display region 401. That is, in a case of the example in FIG. 4B, a TOP button 404 and a SHORT button 405 are always displayed. The TOP button 404 is a button for displaying a screen (hereinafter, an initial screen) displayed in the app display region 401 on the operation unit 106 firstly after the power of the image forming apparatus 100 is turned on. The SHORT button 405 is a button (a shortcut button) for displaying any screen set by the user on the app display region 401. Note, the TOP button 404 and the SHORT button 405 are displayed here, but other buttons which are common across apps may be displayed.

In this way, by displaying the left menu region 402 only in a case where the operation unit 106 with the WSVGA resolution is used, the same display content and operability can be provided to the user using the same program for the app for both of the operation units 106 of the two resolutions. Note, in the case of WSVGA resolution, because the left menu region 402 is displayed, a difference arises in the coordinates included in the event information detected by the driver unit 301 when the user touches the app display region 401. The processing of the event management unit 302 for handling this difference of the coordinate is described later using FIG. 7. Note, the description is given using examples of SVGA and WSVGA, but it is similar even with configurations of the operation unit 106 having other resolutions.

[Graphics Controller Unit]

Next, a description of processing of the C graphics controller unit 306 and the Java graphics controller unit 308 is given. These graphic controllers have different configurations, and event information that is required in each graphic controller is also different. Note, description is given assuming that the SVGA resolution is a standard resolution (hereinafter referred to as a standard resolution) and all apps operating on the graphic controller are created based on this the standard resolution in the present embodiment. Note, it is assumed that the resolution that is made to be the standard resolution is not limited to SVGA, and it is possible to define which resolution is made to be the standard in accordance with the relationship between resolutions.

(C Graphics Controller Unit)

Firstly, a description of the C graphics controller unit 306 is given. The information of a rendering controller used by an app of the C app unit 307 is stored for each app on the HDD 104 in a table format in advance. Hereinafter, the expression of information of rendering controllers is called a "rendering controller management table". Here the rendering controller management table is described using a concrete example.

As illustrated in FIGS. 5A and 5B, a controller type, an ID, a region, a parent ID, and a corresponding operation, are associated and managed in the rendering controller management table. Controller type expresses the type of the rendering controller and includes window, button, list, or the like. ID is a number functioning as identification information for identifying each controller uniquely. Region is an arrangement position (display position) of the respective controller, and top-left coordinates and bottom-right coordinates are recited. Note, here X indicates a horizontal direction and Y indicates a vertical direction in coordinates (X, Y). Parent ID is the ID of a window that is a base (base window) for the laying out of the respective controller. The C graphics controller unit 306 according to the embodiment is described assuming that there is only one base window and that the size of the base window is always the same size as the app display region 401. Corresponding operation is an operation performed when each controller is selected.

Figure 6A:
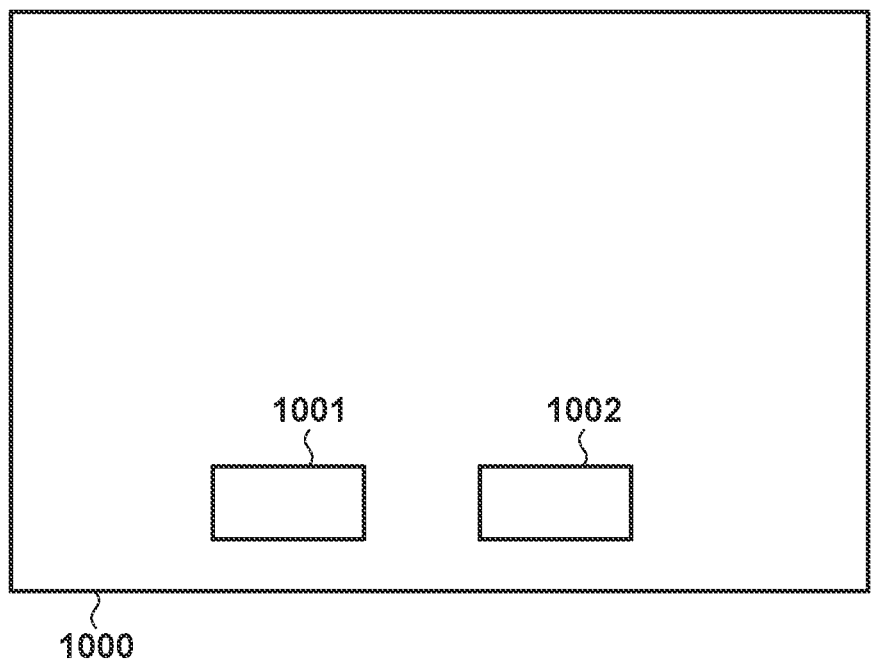
FIGS. 6A and 6B are views illustrating examples of screens displayed on the operation unit of the image forming apparatus.

A concrete example of a corresponding operation is described. It is assumed that the information of the rendering controller used by an app (app X) is as in FIG. 5A. The rendering controller management table illustrated in FIG. 5A is representing that a window of the ID "1000" and a window of the ID "2000" is displayed on a window (base window) of the ID "1" for a app X. Also, a button of the ID "1001" and a button of the ID "1002" are laid out on the window of the ID "1000" in FIG. 5A. If the user selects the button of the ID "1001", a screen of the window of the ID "2000" is displayed. Also, if the user selects the button of the ID "1002", a screen of the window of the ID "3000" is displayed. Note, a result of displaying on the operation unit 106 the window of the ID "1000", the button of the ID "1001", and the button of the ID "1002" in FIG. 5A is displayed in FIG. 6A. Note, reference numerals shown in FIG. 6A correspond to the IDs in FIG. 5A.

Next, a description of coordinates of event information required by the C graphics controller unit 306 is given. For selection of a button displayed by the app of the C app unit 307, it is necessary for the coordinates included in the event information transmitted to the C graphics controller unit 306 to be coordinates in a region of the selected button. All apps of the C graphics controller unit 306 performs a determination as to whether or not the coordinates are in the region of the button using relative coordinates. Then, the coordinates are in the region of the button, the C graphics controller unit 306 recognizes that the button is selected and an execution request of an operation corresponding to the button is transmitted to the C app unit 307. Note, the relative coordinates are similarly used in a case of a controller other than a button.

Here, a description is given of the relative coordinates and the absolute coordinate as coordinate systems used by the respective graphics controller units. The relative coordinates are coordinates representing a position touched by the user from the origin point, when, for example, a top-left of the app display region 401 is made to be the origin point. On the other hand, the absolute coordinates are coordinates representing a position touched by the user from the origin point, when, for example, a top-left of the operation unit 106 is made to be the origin point. Therefore, if the resolution of the operation unit 106 is SVGA, values of the relative coordinates and the absolute coordinates are the same in the present embodiment. On the other hand, if the resolution is WSVGA, the absolute coordinates and the relative coordinates have different coordinate values. Here, if the same position of the operation unit 106 is indicated, coordinates in at least one of the vertical direction or the horizontal direction of the relative coordinates becomes smaller. The relative coordinate values are calculated by the event management unit 302 obtaining resolution information of the operation unit 106 from the operation unit management unit 303. The detail of this obtainment processing is described later.

(Java Graphics Controller Unit)

Figure 6B:
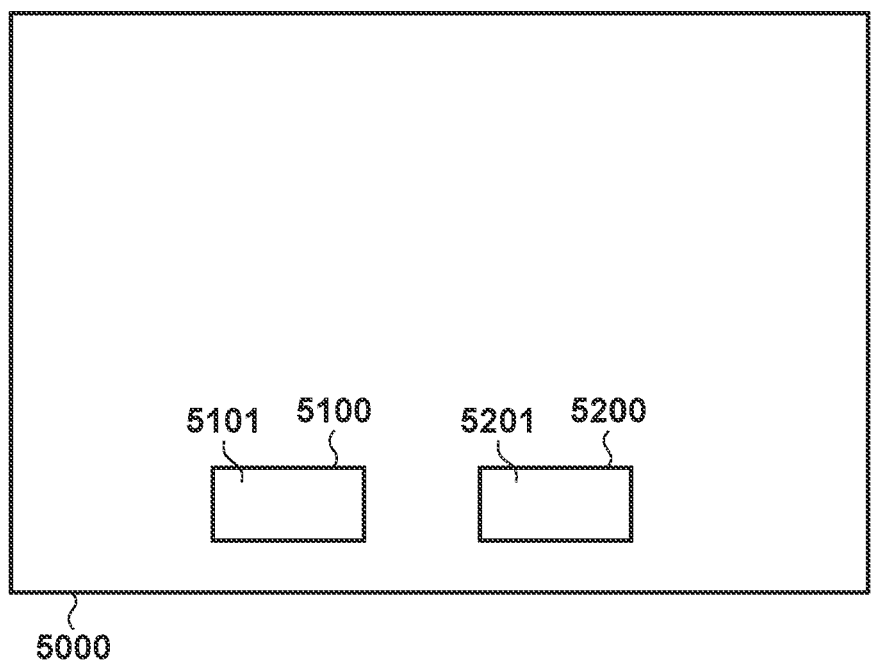

Next, the description of the Java graphics controller unit 308 will be given. The Java graphics controller unit 308 is a group of rendering controllers that apps of the Java app unit 309 can use. The rendering controller is for example a button or a window. However, the Java graphics controller unit 308 is a window-based controller and capable of laying out only one rendering controller on one window. Therefore, in a case where a screen for displaying 2 buttons as FIG. 6B is displayed on the operation unit 106, the rendering controller management table is configured as in FIG. 5B. Note, reference numerals shown in FIG. 6B correspond to the IDs in FIG. 5B.

In FIG. 5B, a window of the ID "5000" is laid out on a window (base window) of the ID "1". Also, a window of the ID "5100" and a window of the ID "5200" are laid out on the window of the ID "5000". Additionally, a button of the ID "5101" is laid out on a window of the ID "5100" and a button of the ID "5201" is laid out on a window of the ID "5200". A result of displaying the rendering controller management table of FIG. 5B on the operation unit 106 is shown in FIG. 6B. Note, hereinafter a window for laying out a controller such as a button is called a "child window".

Here, a description of coordinates of event information required by the Java graphics controller unit 308 is given. The Java graphics controller unit 308 is a window-based controller and which window the event information is transmitted to is determined using both relative coordinates and absolute coordinates. However, the absolute coordinates necessary for the Java graphics controller unit 308 are coordinates whose origin point is made to be the top-left of the app display region and not coordinates whose origin point is made to be the top-left of the operation unit 106. Therefore, unlike the C graphics controller unit 306, it is necessary to create coordinates whose origin point is made to be the top-left of base window. Note, the relative coordinates are coordinates whose origin point is made to be the top-left of the child window that transmits the event, and the thinking behind the relative coordinates is the same in the C graphics controller unit 306 and the Java graphics controller unit 308. The values of the absolute coordinates and the relative coordinates are set by the event management unit 302 using the operation unit management unit 303 and the event information changing unit 304. The detail of the setting processing here is described later.

[Process Flow]

Figure 7:
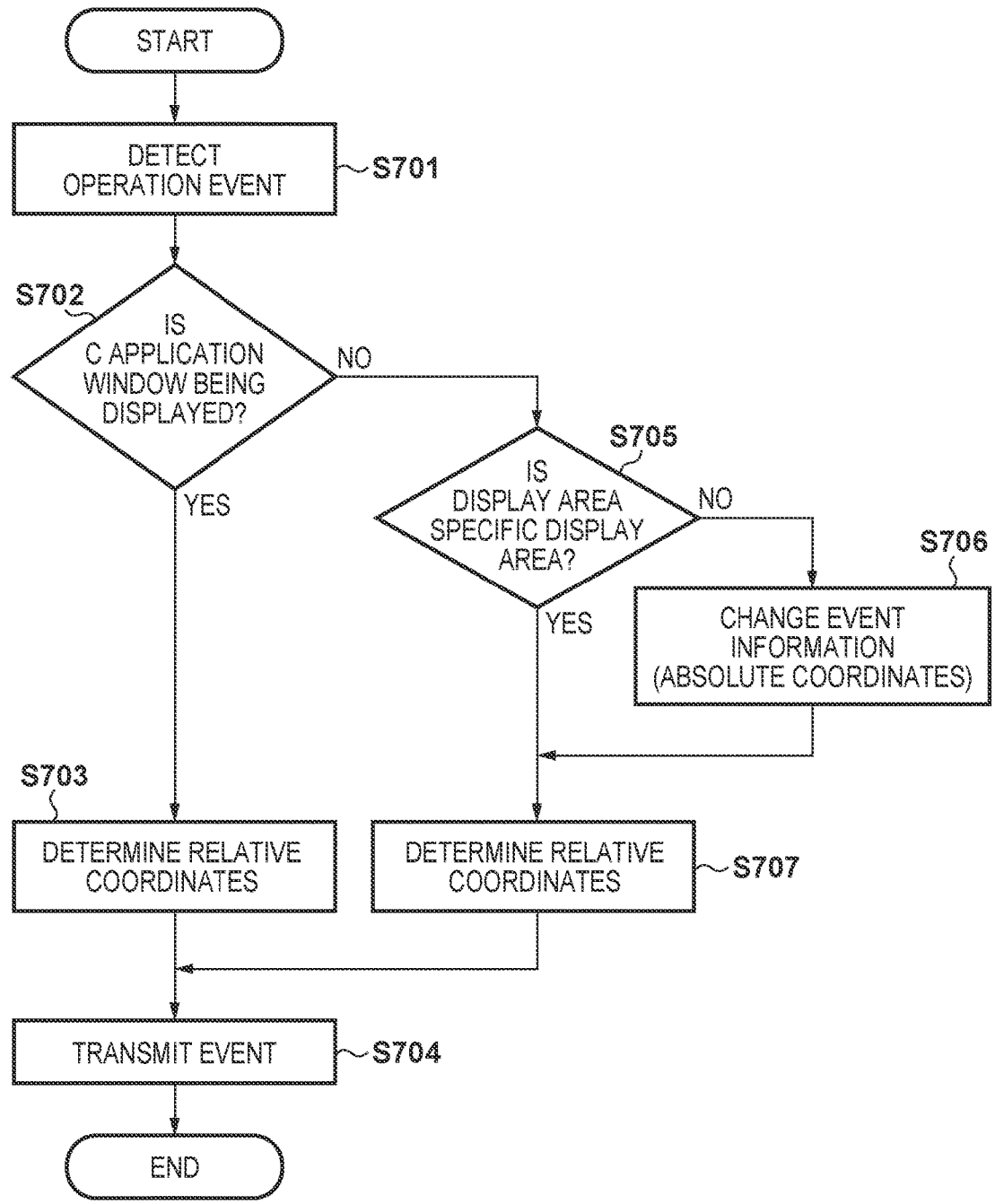
FIG. 7 is a flowchart representing event control processing in accordance with a user operation according to the present application invention.

Next, processing from when event information is detected in the driver unit 301 up until when the event information is transmitted to the C graphics controller unit 306 or the Java graphics controller unit 308 is described using FIG. 7. Note, a calculation of various coordinates performed during processing is explained in detail later using concrete coordinate values.

When the user performs an operation such as pressing a target object in the operation unit 106, the driver unit 301 detects the event information in step S701. This event information includes the type of the event (a type of an operation such as a press or a release) and the coordinate information, and the coordinate information is the absolute coordinates whose origin point is the top-left of the operation unit 106. Note, the approach to detecting the event information may be to use a detection approach of a general resistive type (pressure-sensitive type) or an electrostatic type operation unit, for example, and details are omitted. The driver unit 301 transmits the detected event information to the event management unit 302. When the event management unit 302 receives the event information, a request to obtain information of the window being displayed on the operation unit 106 is transmitted to the window management unit 305. Here, the window information is information indicating whether the displayed window is a window of a C app or a window of a Java app. When the window management unit 305 receives a request to obtain information of the window, it obtains information of the window being displayed on the operation unit 106, and transmits that information to the event management unit 302.

In step S702, when the window information is received, the event management unit 302 determines whether or not a window of a C app is being displayed. If it is determined that a window of a C app is being displayed (YES in step S702), the processing proceeds to step S703. On the other hand, if it is determined that the C app window is not being displayed (NO in step S702), that is if a Java app window is being displayed, the processing proceeds to step S705.

In step S703, the event management unit 302 performs processing for determining the relative coordinates. The relative coordinates are included in the event information transmitted to the window management unit 305 and the C graphics controller unit 306. Firstly, the event management unit 302 transmits a request for obtaining the resolution of the operation unit 106 to the operation unit management unit 303. When the operation unit management unit 303 receives the resolution obtainment request, it obtains the resolution of the operation unit 106, and transmits the resolution to the event management unit 302. When the event management unit 302 receives the resolution information, it performs a determination of the relative coordinates. Specifically, in a case where the received resolution information indicates the standard resolution (SVGA), the event management unit 302 determines coordinates that are the same as the absolute coordinates as the relative coordinates. On the other hand, in the case of a non-standard resolution, the event management unit 302 determines coordinates that take into consideration the difference between the resolution indicated by the obtained resolution information and the standard resolution as the relative coordinates. Here, the coordinates that take into consideration the difference between the resolution indicated by the obtained resolution information and the standard resolution correspond to coordinates for which the size of the left menu region 402 is subtracted from the absolute coordinates. Then, the processing proceeds to step S704.

In step S704, the event management unit 302 creates event information including the determined relative coordinates in the event information received from the driver unit 301 and transmits the information to the window management unit 305. The window management unit 305 which has received the event information specifies a window of an app being displayed on the operation unit 106 and specifies a graphic controller including the window. Here, the window of the C app is displayed on the operation unit 106, so the window management unit 305 transmits the event information transmitted from the event management unit 302 to the C graphics controller unit 306. This processing flow is then terminated.

In step S705, the event management unit 302 performs a determination as to whether or not the display region of the operation unit 106 is a specific display region. In the present embodiment, the event management unit 302 obtains the resolution information by transmitting a resolution obtainment request to the operation unit management unit 303, and determines that it is a specific display region if the resolution indicated by the received resolution information is the standard resolution. If it is determined that the resolution of the operation unit 106 is the standard resolution (YES in step S705) the processing proceeds to step S707, and if it is determined not to be the standard resolution (NO in step S705) the processing proceeds to step S706.

In step S707, the event management unit 302 determines the relative coordinates based on the coordinates (absolute coordinates) of the event information received from the driver unit 301. A description of an approach to determining the relative coordinates will be given. The event management unit 302 transmits the absolute coordinates received from the driver unit 301 to the window management unit 305. Then, the window management unit 305 transmits the coordinates to the Java graphics controller unit 308. The Java graphics controller unit 308 searches for a window including the received absolute coordinates from out of windows being displayed on the operation unit 106, and transmits origin point coordinates of the window (top-left coordinates) to the window management unit 305. After reception of the origin point coordinates of the window, the window management unit 305 transmits them to the event management unit 302. After reception of the origin point coordinates of the window, the event management unit 302 calculates relative coordinates using the received origin point coordinates and the absolute coordinates received from the driver unit 301. Specifically, the event management unit 302 determines values resulting from subtracting the origin point coordinates of the window from the absolute coordinates to be the relative coordinate. In this way the event management unit 302 determines the relative coordinates.

On the other hand, if it is determined that the resolution of the operation unit 106 is not the standard resolution (NO in step S705), the event management unit 302 changes the absolute coordinates of the event information received from the driver unit 301 using the operation unit management unit 303 and the event information changing unit 304 in step S706. A description of processing for changing the absolute coordinate will be given. Firstly, the event management unit 302 transmits a request for obtaining the resolution of the operation unit 106 to the operation unit management unit 303. When the operation unit management unit 303 receives the resolution obtainment request, it obtains the resolution of the operation unit 106, and transmits obtained resolution information to the event management unit 302. After reception of the resolution information, the event management unit 302 transmits the received resolution information and the absolute coordinates received from the driver unit 301 to the event information changing unit 304. The event information changing unit 304 calculates the difference between the resolution indicated by the received resolution information and the standard resolution, then transmits the coordinates obtained using the calculated difference to the event management unit 302. The event management unit 302, having received this, determines the received coordinates to be the absolute coordinates. Then, the processing proceeds to step S707 and the event management unit 302 determines the relative coordinates based on the absolute coordinates determined in step S706. That is, the event management unit 302 determines as the relative coordinates values obtained by subtracting the origin point coordinates of the window from the absolute coordinates determined in step S706.

After determining the relative coordinate in step S707, the event management unit 302 creates event information including the absolute coordinates and the relative coordinates, and transmits it to the window management unit 305 in step S704. After receiving the event information, the window management unit 305 transmits the event information transmitted from the event management unit 302 to the Java graphics controller unit 308. The Java graphics controller unit 308 transmits a request to execute an operation corresponding to an app that is being displayed to the Java app unit 309 based on the received event information. The processing is the same as that of a general windows-based graphic system (for example an X11-based windows system), so details are omitted. This processing flow is then terminated.

Processing Example

A concrete example of the processing indicated in FIG. 7 is described. Firstly, description is given of a concrete example of a C app and a Java app in a case when the operation unit 106 having the standard resolution (SVGA) is connected to the image forming apparatus 100. After that, description is given of a concrete example of a C app and a Java app in a case when the operation unit 106 having a resolution (WSVGA) that is not the standard resolution is connected to the image forming apparatus 100.

(Standard Resolution and C App)

Figure 8A:
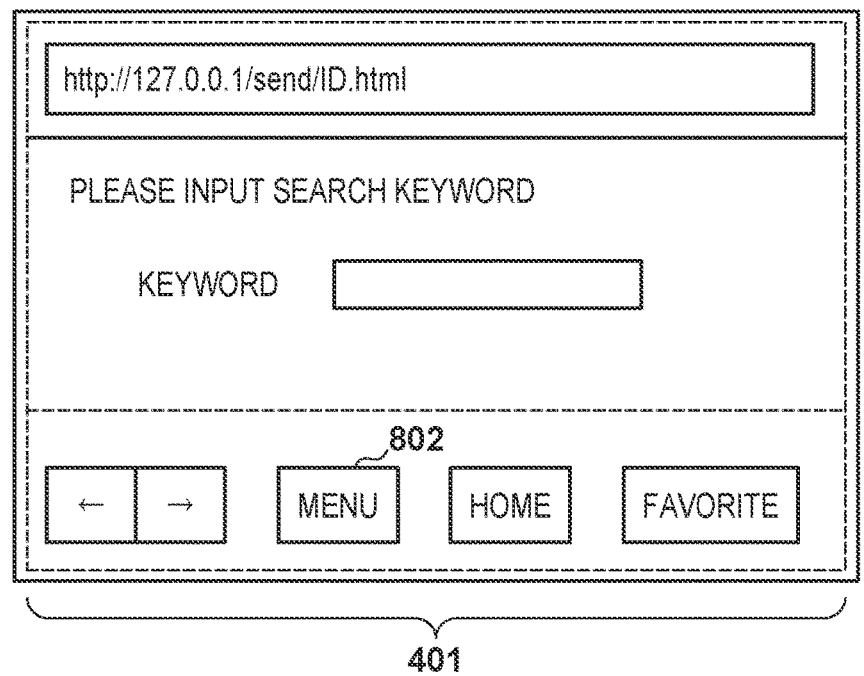
FIGS. 8A and 8B are views illustrating examples of screens displayed on the operation unit of the image forming apparatus.

Firstly, a description of a concrete example in a case when a browser app (a C app) is displayed in the operation unit 106 of the standard resolution will be given. FIG. 8A is an example of displaying of the browser app displayed in the operation unit 106. A URL is displayed in the upper part of the screen of FIG. 8A, a keyword input button for inputting a search keyword is displayed in the middle part of the screen, and buttons to perform a page transition and various kinds of settings are displayed in the lower part of the screen. In this screen, a concrete example in a case when a MENU button 802 which is one of various kinds of setting buttons is pressed is described. Note, it is assumed that a region of the MENU button 802 is (220, 470) to (370, 550), similarly to the button of the ID "1001" in FIG. 5A.

If the user presses the MENU button 802 in the operation unit 106, the driver unit 301 detects event information (step S701). It is assumed that this event information is that the event type is touch and the coordinates are absolute coordinates (250, 500). The driver unit 301 transmits this event information to the event management unit 302.

The event management unit 302, having received this event information, transmits a request to obtain window information to the window management unit 305, and based on a result transmitted from the window management unit 305, determines whether or not the window of the C app is displayed in the operation unit 106 (step S702). Here because it is the window of the C app (YES in step S702), the event management unit 302 performs processing to determine the relative coordinates (step S703). Firstly, the event management unit 302 transmits a resolution obtainment request to the operation unit management unit 303, and obtains information of the resolution. Because it is the standard resolution here, the relative coordinates are the coordinates (250, 500) which are the same coordinates as the absolute coordinates.

Then, the event management unit 302 adds the relative coordinates to the event information received from the driver unit 301, and transmits the information to the window management unit 305 (step S704). Here, the window management unit 305, having received this event information, transmits the event information to the C graphics controller unit 306, and furthermore the event information from the C graphics controller unit 306 is transmitted to the browser app. Then, the browser app performs press processing for the MENU button 802, as the processing corresponding to a touch event of a relative coordinate (250, 500).

(Standard Resolution and Java app)

Next, a description of a concrete example in a case when a copy app (a Java app) is displayed in the operation unit 106 of the standard resolution will be given. FIG. 4A is an example of displaying of the copy app displayed in the operation unit 106. A screen title is displayed in the upper part of the screen of FIG. 4A, setting content is displayed in the middle part of the screen, and buttons performing various kinds of setting is displayed in the lower part of the screen. Description is given of a concrete example in a case when a paper size button 403 which is one of various kinds of setting buttons is pressed in this screen. Note, it is assumed that a region of the paper size button 403 is (220, 470) to (370, 550), similarly to the button of the ID "5101" in FIG. 5B.

If the user presses the paper size button 403 in the operation unit 106, the driver unit 301 detects event information (step S701). It is assumed that this event information is that the event type is touch and the coordinates are absolute coordinates (250, 500). The driver unit 301 transmits this event information to the event management unit 302.

The event management unit 302, having received this event information, transmits a request to obtain window information to the window management unit 305, and based on a result transmitted from the window management unit 305, determines whether or not the window of the C app is displayed in the operation unit 106 (step S702). Because it is the window of the Java app here (NO in step S702), the event management unit 302 transmits a resolution obtainment request to the operation unit management unit 303, and obtains information of the resolution. Then, the event management unit 302 performs a determination of whether or not the obtained resolution is the standard resolution (step S705). Here because it is the standard resolution (YES in step S705), the event management unit 302 performs processing to determine the relative coordinates (step S707).

Specifically, the event management unit 302 transmits the absolute coordinates (250, 500) to the window management unit 305, and the window management unit 305 transmits this information to the Java graphics controller unit 308. Then, the Java graphics controller unit 308 detects the origin point coordinates of the window including the received coordinates from out of one or a plurality of windows being displayed on the operation unit 106, and transmits them to the window management unit 305. Here, the window of ID "5100" of FIG. 5B is searched, and the coordinates (220, 470) are transmitted to the window management unit 305 as the origin point coordinates. The window management unit 305, having received these coordinates, transmits this information to the event management unit 302. The event management unit 302 subtracts the origin point coordinates (220, 470) from the absolute coordinates (250, 500), and determines the relative coordinates to be the coordinates (30, 30). Then, the event management unit 302 transmits the event information including the absolute coordinates and the relative coordinates to the window management unit 305 (step S704). This event information, is further transmitted to the Java graphics controller unit 308 and the copy app, and the copy app performs press processing for the paper size button 403, as the processing corresponding to the touch event of the absolute coordinates (250, 500) and the relative coordinates (20, 30).

(Non-Standard Resolution and C app)

Figure 8B:
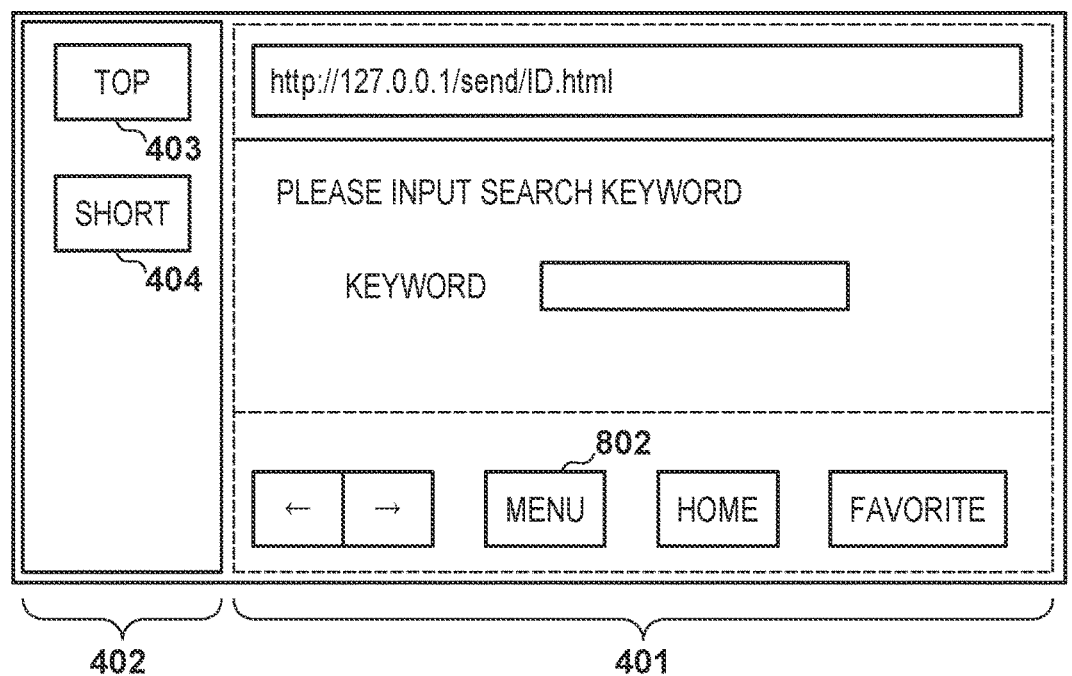

Next, a description of a concrete example in a case when the browser app (a C app) is displayed in the operation unit 106 of the standard resolution will be given. FIG. 8B is an example of displaying of the browser app displayed in the operation unit 106. The display content of the app display region 401 in this screen is the same of the display content of the app display region 401 in FIG. 8A. In this screen, a concrete example in a case when a MENU button 802 which is one of various kinds of setting buttons is pressed is described. Note, it is assumed that a region of the MENU button 802 is (220, 470) to (370, 550), similarly to the button of the ID "1001" in FIG. 5A.

If the user presses the MENU button 802 in the operation unit 106, the driver unit 301 detects event information (step S701). It is assumed that this event information is that the event type is touch and the coordinates are absolute coordinates (474, 500). The driver unit 301 transmits this event information to the event management unit 302.

The event management unit 302, having received this event information, determines whether or not the window of the C app is displayed in the operation unit 106 (step S702). The detail of this processing is same as in the case of the previously described standard resolution, so the description is omitted. Here because it is the window of the C app (YES in step S702), the event management unit 302 performs processing to determine the relative coordinates (step S703). Firstly, the event management unit 302 transmits a resolution obtainment request to the operation unit management unit 303, and obtains information of the resolution. Here because it is not the standard resolution, values for which a difference of the obtained resolution and the standard resolution are considered are made to be the relative coordinates.

Specifically, if the obtained resolution is WSVGA (1024*600) and the standard resolution is SVGA (800*600), the x-coordinate of the obtained resolution is 224 larger. Thus, 224 is subtracted from the x-coordinate of the absolute coordinates (474, 500), and the relative coordinates are determined to be the coordinates (250, 500). After the relative coordinate determination, the event management unit 302 adds the relative coordinates to the event information received from the driver unit 301, and transmits the information to the window management unit 305 (step S704). The processing until pressing of the MENU button 802 after this is the same as in the case of the previously described standard resolution, so description thereof is omitted.

(Non-Standard Resolution and Java app)

Finally, a description of a concrete example in a case when a copy app (a Java app) is displayed in the operation unit 106 of the standard resolution will be given. FIG. 4B is an example of displaying of the copy app displayed in the operation unit 106. The display content of the app display region 401 in this screen is the same of the display content of the app display region 401 in FIG. 4A. Description is given of a concrete example in a case when the paper size button 403 which is one of various kinds of setting buttons is pressed in this screen. Note, it is assumed that a region of the paper size button 403 is (220, 470) to (370, 550), similarly to the button of the ID "5101" in FIG. 5B.

If the user presses the paper size button 403 in the operation unit 106, the driver unit 301 detects event information (step S701). It is assumed that this event information is that the event type is touch and the coordinates are absolute coordinates (474, 500). The driver unit 301 transmits this event information to the event management unit 302.

The event management unit 302, having received this event information, determines whether or not the window of the C app is displayed in the operation unit 106 (step S702). The detail of this processing is same as in the case of previously described the standard resolution, so the description is omitted. Here because it is the window of the Java app (NO in step S702), the event management unit 302 obtains information of the resolution, and performs a determination as to whether or not it is the standard resolution (step S705). The detail of this processing is same as in the case of previously described the standard resolution, so the description is omitted. Here because it is not the standard resolution (NO in step S705), the event management unit 302 performs a change of the absolute coordinates of the event information (step S706).

Specifically, the event management unit 302 transmits the resolution (1024*600) which is the information of the resolution from the operation unit management unit 303 and the absolute coordinate (474, 500) which is received from the driver unit 301 to the event information changing unit 304. The event information changing unit 304 received this calculates that the difference between the received resolution (1024*600) and the standard resolution (800*600) is 224 for the x-coordinate. Then, the event information changing unit 304 changes the coordinates (250, 500) to absolute coordinates by subtracting the calculated 224 from the x-coordinate of the absolute coordinates. Furthermore, the event information changing unit 304 transmits these changed absolute coordinates to the event management unit 302. The event management unit 302 makes these absolute coordinates be the absolute coordinates of the event information. Then, the event management unit 302 transmits the event information to the window management unit 305 (step S704). With this, the press processing for the paper size button 403 of the copy app is performed, but these processes are the same as in the case of the previously described the standard resolution, so the description is omitted.

As described above, the coordinates of a detected event are changed in accordance with the window of the app which is being displayed and the resolution of operation unit. With this, it is possible to cause apps to operate normally without changing already existing apps even in an image forming apparatus comprising a plurality of the graphics controller units which operates using different event information.

In the present embodiment, a description of an example using operation units whose resolution is SVGA or WSVGA is given as a concrete example of determination of the display region. However, it is possible to apply the present embodiment to operation units of other resolutions. Also, depending on the relationship between the resolutions, configuration may be such that not only the x-coordinate but also the y-coordinate is changed in the change (step S706) of the absolute coordinates included in the event information. With this, whatever the resolution of the operation unit, the app is able to perform the operation correctly without remaking the existing app.

In the present embodiment, description is given using examples of the C graphic controller and the Java graphic controller, but limitation is not made to this. If there are a plurality of graphic controllers for which conversion of event information (absolute coordinates/relative coordinates) is required, a graphic controller other than those described above may also be used. Additionally, in a case when the information processing apparatus has three or more graphic controllers, configuration may be taken so as to change the coordinates in accordance with the characteristics of each graphic controller.

In the present embodiment, the top-left of the window is made to be the origin point, but a reference point other than the top-left may be generated as the origin point, and coordinates from this reference point may be used. With this, even in a system in which the origin point of position information of the system is not the top-left but the bottom-right, the app is able to operate correctly without remaking the conventional app.

Second Embodiment

In the first embodiment, in the determination of the display region (step S705 in FIG. 7), the determination is performed using the resolution of the operation unit 106. However, the determination may be performed using information of the operation unit 106 other than the resolution. In the present embodiment, description will be given of an embodiment in which a window size of an app being displayed is used in the determination of the display region. Note, basic processing and control is the same as in the first embodiment, so description will be given only for points that differ from the first embodiment.

Figure 9A:
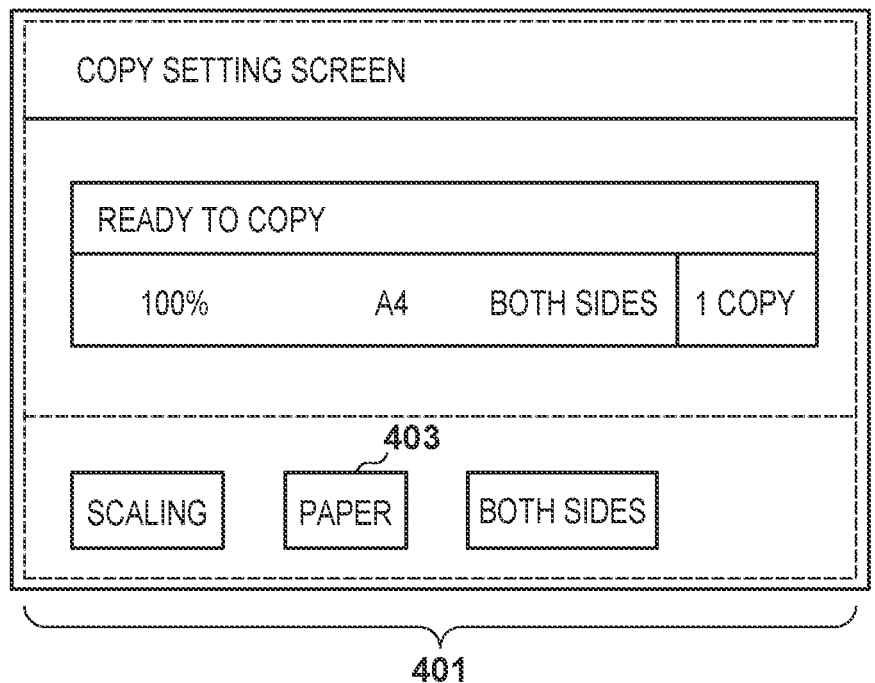
FIGS. 9A and 9B are views illustrating examples of screens displayed on the operation unit of the image forming apparatus.
Figure 9B:
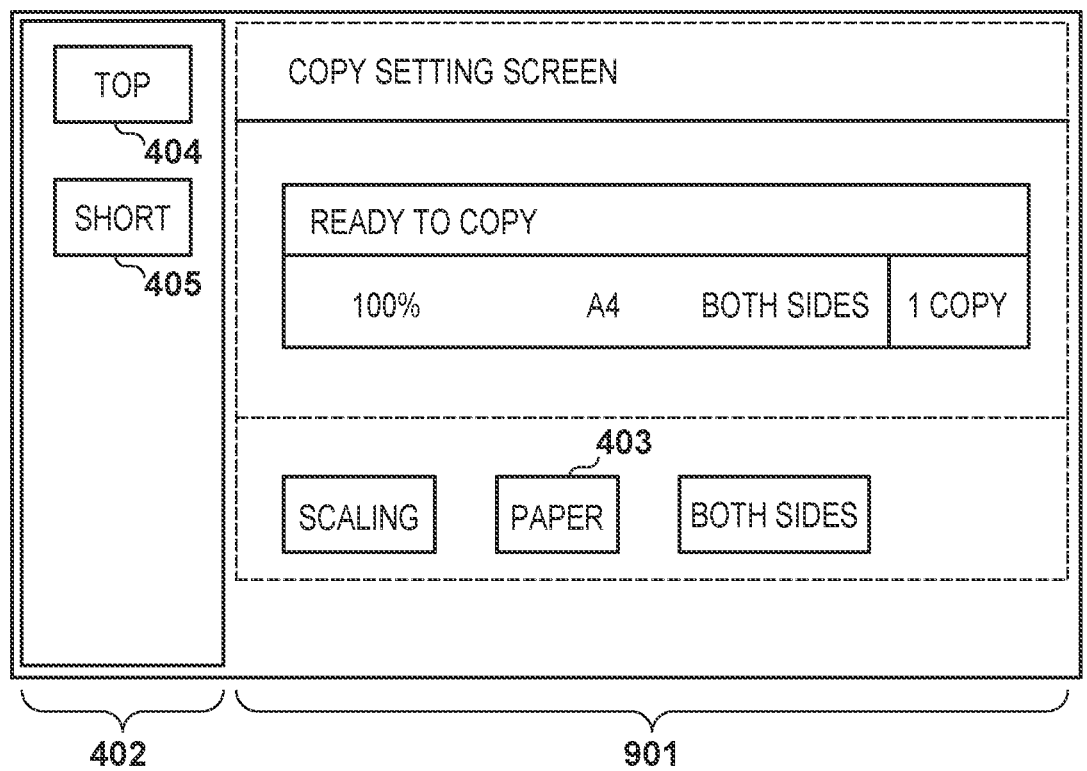

Using FIGS. 9A and 9B, description will be given of an example in which the window size (the app region) of the app is used in the determination of the display region (step S705). FIG. 9A is a screen in which an app is displayed in an operation unit 106 whose resolution is SVGA similarly to FIG. 4A. On the other hand, FIG. 9B, similarly to FIG. 4B, displays the left menu region 402, and the display region of the app is made to be a screen that is an app display region 901 by aligning to the resolution of SVGA.

In the determination of the display region (step S705), the event management unit 302 makes a request to obtain a window size of an app being displayed in the operation unit 106 to the window management unit 305. In a case of the display on the operation unit 106 illustrated in FIG. 9A, the window size of the app display region 401 is the same as the display region of the operation unit 106. In such a case, the display region is treated as a specific display region (YES in step S705). Thus, the event management unit 302, performs (step S707) processing to determine the relative coordinates without changing the absolute coordinates included in the event information. On the other hand, in a case of the display on the operation unit 106 illustrated in FIG. 9B, the window size of the app display region 401 is different to the display region of the operation unit 106. That is, the app display region 401 is a display region that is smaller than the whole screen. In that case, the display region is treated as not being a specific display region (YES in step S705). Thus, the event management unit 302 performs (step S706) processing to change the absolute coordinates included in the event information and then performs (step S707) processing to determine the relative coordinates. Subsequent processing is the same as in the first embodiment, so the description is omitted.

As described above, by using the window size of the app in the determination of the display region, it becomes possible for an existing app to operate correctly without remaking the app in a case when the resolution of the operation unit 106 is same but the window size of the app is different.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-031461, filed Feb. 22, 2016, which is hereby incorporated by reference herein in its entirety.

What is claimed is:

1. An information processing apparatus that has a display unit and a plurality of graphic controllers, the apparatus comprising:
at least one processor and a memory storing instructions which, when executed by the at least one processor, cause the information processing apparatus to:
cause the display unit to display, using a graphic controller corresponding to an application of the plurality of graphic controllers, a screen of the application;
detect an event that is generated by a user operation to the screen displayed on the display unit;
determine, when the event is detected, the graphic controller corresponding to the application displaying the screen on the display unit; and
based on a resolution of the display unit and information of the graphic controller for which the determination is made, convert coordinate information on the display unit of the user operation that the event indicates to a value of a coordinate system corresponding to the graphic controller for which the determination is made, and transmit a result of the conversion to the application.

2. The information processing apparatus according to claim 1, wherein
as the event, a value in a coordinate system for the display unit on which the user operation is performed is detected, and
based on the resolution of the display unit and information of the graphic controller for which the determination is made, the coordinate information on the display unit of the user operation that the event indicates to the value of the coordinate system for a screen being displayed on the display unit.

3. The information processing apparatus according to claim 1, wherein
based on a size of a screen that the application is displaying on the display unit, the coordinate information of the user operation that the event indicates is converted to the value of the coordinate system corresponding to the graphic controller corresponding to the application.

4. The information processing apparatus according to claim 1, wherein
the plurality of graphic controllers comprises
a first graphic controller configured to be used by a C application which is implemented in a C language and
a second graphic controller configured to be used by a Java application which is implemented in a Java language.

5. The information processing apparatus according to claim 4, wherein
in a case when the application being displayed on the screen is determined to be a C application and the resolution of the display unit is a first resolution at which the application is displayed on the entirety of the screen, the coordinate information of the user operation that the event indicates is not converted, and
in a case when the application being displayed on the screen is determined to be a C application and the resolution of the display unit is a second resolution at which a display region in which the screen of the application is displayed and a display region in which other display content is displayed are included, the coordinate information of the user operation that the event indicates is converted based on a difference between the first resolution and the second resolution, and
in a case when the application being displayed on the screen is determined to be a Java application, and the resolution of the display unit is the first resolution, the coordinate information of the user operation that the event indicates to a value of a coordinate system corresponding to the second graphic controller is converted, and
in a case when the application being displayed on the screen is determined to be a Java application, and the resolution of the display unit is the second resolution, coordinate information of the user operation that the event indicates to a value of a coordinate system corresponding to the second graphic controller is further converted based on the difference between the first resolution and the second resolution.

6. A method of controlling an information processing apparatus that has a display unit and a plurality of graphic controllers, the method comprising:

causing the display unit to display, using a graphic controller corresponding to an application of the plurality of graphic controllers, a screen of the application;

detecting an event that is generated by a user operation to the screen displayed on the display unit;

determining, when the event is detected, the graphic controller corresponding to the application displaying the screen on the display unit; and based on a resolution of the display unit and information of the graphic controller for which the determination is made, converting coordinate information on the display unit of the user operation that the event indicates to a value of a coordinate system corresponding to the graphic controller for which the determination is made, and transmitting a result of the conversion to the application.

7. A non-transitory computer-readable storage medium storing a program for causing a computer that has a display unit and a plurality of graphic controllers to execute a method, the method comprising:

causing the display unit to display, using a graphic controller corresponding to an application of the plurality of graphic controllers, a screen of the application;

detecting an event that is generated by a user operation to the screen displayed on the display unit;

determining, when the event is detected, the graphic controller corresponding to the application displaying the screen on the display unit; and based on a resolution of the display unit and information of the graphic controller for which the determination is made, converting coordinate information on the display unit of the user operation that the event indicates to a value of a coordinate system corresponding to the graphic controller for which the determination is made, and transmitting a result of the conversion to the application.

* * * * *